US010361796B2

(12) United States Patent
Rozmaryn et al.

(10) Patent No.: US 10,361,796 B2
(45) Date of Patent: Jul. 23, 2019

(54) SYSTEMS AND METHODS FOR SATELLITE NOISE AND INTERFERENCE CALIBRATION USING TERMINAL MEASUREMENTS

(71) Applicant: HUGHES NETWORK SYSTEMS, LLC, Germantown, MD (US)

(72) Inventors: Jacob Rozmaryn, Silver Spring, MD (US); Matthew Benjamin Baer, Gaithersburg, MD (US); Javier Alveiro Monroy, Arlington, VA (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 15/676,785

(22) Filed: Aug. 14, 2017

(65) Prior Publication Data
US 2017/0373771 A1 Dec. 28, 2017

Related U.S. Application Data

(62) Division of application No. 14/590,776, filed on Jan. 6, 2015, now Pat. No. 9,749,067.

(51) Int. Cl.
*H04B 17/21* (2015.01)
*H04W 24/10* (2009.01)
*H04B 7/185* (2006.01)

(52) U.S. Cl.
CPC .......... *H04B 17/21* (2015.01); *H04B 7/1851* (2013.01); *H04B 7/18519* (2013.01); *H04W 24/10* (2013.01)

(58) Field of Classification Search
CPC .. H04B 17/21; H04B 7/18519; H04B 7/1851; H04B 7/185; H04W 24/10
(Continued)

(56) References Cited

U.S. PATENT DOCUMENTS 6,445,916 B1 * 9/2002 Rahman ................ H04M 15/00
455/423
6,847,817 B2 * 1/2005 Hadinger ........... H04B 7/18584
455/12.1
(Continued)

FOREIGN PATENT DOCUMENTS

EP    2282420    10/2016

OTHER PUBLICATIONS

International Search Report and Written Opinion for International Application No. PCTUS2016012230, dated Apr. 11, 2016, European Patent Office.
(Continued)

*Primary Examiner* — Man U Phan
(74) *Attorney, Agent, or Firm* — Sheppard, Mullin, Richter & Hampton LLP

(57) ABSTRACT

Systems and methods are provided for satellite noise and interference calibration using satellite terminal measurements. In one implementation, a method includes partitioning a satellite network into a first partition including a plurality of terminals and a plurality of inroute frequency channels (IFCs); instructing the plurality of terminals of the partition to measure the SINR of the plurality of IFCs; processing the plurality of SINR measurements to compute normalized IFC measurements for each of the plurality of terminals; processing the normalized IFC measurements for each terminal to compute final calibrated IFC SINR offsets for each IFC of the partition; and normalizing the final calibrated IFC SINR offsets with respect to a lowest SINR offset IFC. The normalized final calibration offsets may be made available to each of the satellite terminals. During subsequent operation, the satellite terminals may consider the amount of interference present in an IFC before switching to the channel.

28 Claims, 13 Drawing Sheets

(58) Field of Classification Search
USPC ........................................................ 370/252
See application file for complete search history.

(56) References Cited

U.S. PATENT DOCUMENTS

| | | | |
|---|---|---|---|
| 7,043,199 B2 | 5/2006 | Dai | |
| 8,160,631 B2 | 4/2012 | Raghothaman | |
| 8,385,223 B2* | 2/2013 | Miller | H04B 7/18513 370/252 |
| 8,437,794 B2 | 5/2013 | Weaver | |
| 8,483,609 B2* | 7/2013 | Miller | H04B 7/18513 370/316 |
| 8,547,863 B2* | 10/2013 | Miller | H04B 7/18586 370/252 |
| 8,576,118 B2 | 11/2013 | Miller | |
| 8,700,957 B2* | 4/2014 | La Fever | G06F 21/577 714/30 |
| 8,928,526 B2 | 1/2015 | Miller | |
| 8,953,726 B2 | 2/2015 | Chen | |
| 8,954,000 B2* | 2/2015 | Rozmaryn | H04B 7/18519 455/12.1 |
| 9,419,701 B2* | 8/2016 | Rozmaryn | H04B 7/18519 |
| 9,749,067 B2* | 8/2017 | Rozmaryn | H04B 17/21 |
| 9,793,980 B2* | 10/2017 | Rozmaryn | H04B 7/18519 |
| 2003/0050015 A1* | 3/2003 | Kelly | H04B 7/18519 455/67.14 |
| 2004/0198237 A1* | 10/2004 | Abutaleb | H04B 7/18582 455/78 |
| 2005/0032472 A1 | 2/2005 | Jiang | |
| 2006/0251180 A1 | 11/2006 | Baum | |
| 2014/0120830 A1 | 5/2014 | Rozmaryn | |
| 2015/0319707 A1 | 11/2015 | Abdelmonem | |
| 2016/0195618 A1 | 7/2016 | Baer | |

OTHER PUBLICATIONS

Communication Pursuant to ARticle 94(3) EPC—Office Action for Europen Application No. 16701085.9-1219 dated Apr. 11, 2018 , 8 pages.

* cited by examiner

SYSTEMS AND METHODS FOR SATELLITE NOISE AND INTERFERENCE CALIBRATION USING TERMINAL MEASUREMENTS

CROSS-REFERENCE TO RELATED APPLICATIONS

This application is a divisional of and claims the benefit of U.S. patent application Ser. No. 14/590,776, filed Jan. 6, 2015, which issued as U.S. Pat. No. 9,749,067 on Aug. 29, 2017.

TECHNICAL FIELD

The present disclosure relates generally to satellite networks. More particularly, some embodiments of the present disclosure are directed toward systems and methods for satellite noise and interference calibration.

BACKGROUND

Modern satellite communication systems provide a robust and reliable infrastructure to distribute voice, data, and video signals for global exchange and broadcast of information. These satellite communication systems have emerged as a viable option to terrestrial communication systems for carrying data traffic such as Internet traffic. A typical satellite Internet system comprises subscriber terminals, a satellite, a ground station, and connectivity to the internet. Communication in such a system occurs along two links: 1) an uplink from a subscriber terminal to the satellite to the ground station to the gateway to the internet; and 2) a downlink from the internet to the gateway to the ground station to the satellite to the subscriber terminal.

The signal quality of a link (up or down) is determined by the signal to interference-plus-noise ratio (SINR) of the link. The higher the SINR, the higher the symbol rate that can be utilized and the more efficient the error correcting codes that can be used, resulting in higher throughput speeds. Generally, for a dynamic variable rate system, each combination of symbol rate and error correcting code rate pair (SYMCOD) will be associated with a SINR operating range. This SINR range is set by the bit error rate (BER) or packet error rate (PER). Specifying a BER or PER will determine at what SINR that combination pair can operate. If a link has enough excess SINR, it may try to operate at a higher SYMCOD. However, if a link has a SINR too low for the SYMCOD it operates at, high PER will result and degrade the throughput speeds and latency of that internet link.

The SINR is determined by the ratio of the signal power divided by the combination of the thermal noise power and the power level of other sources of interference. The thermal noise is a function of the temperature of the receiving hardware, and is typically flat over the frequency operating range. By contrast, other sources of interference generally are not flat and may vary from frequency to frequency. These other sources may include adjacent satellites operating at the same frequency bands, other subscriber terminals with the local satellite operating at the same or adjacent frequencies, or other system components that operate at the same or adjacent frequencies.

For inroute transmissions from a subscriber terminal to the satellite, the uplink frequency band is partitioned into subband channels known as inroute frequency channels (IFC). Generally, each IFC operates a specific symbol rate (e.g., 1.024 Msps, 2.048 Msps, 4.096 Msps, etc.) During operation, a subscriber terminal may jump from one IFC to another following an ALOHA messaging scheme. For example, a subscriber terminal may jump to an IFC operating at a higher SYMCOD if it determines there is enough of a margin to do so while operating at an acceptable PER on the new channel.

However, because each IFC operates at a different frequency, the SINR of each channel may be different. If the subscriber terminal does not know the SINR of the target IFC in advance, it only accounts for the SYMCOD of the target IFC in determining whether there is enough margin to make the jump. Where the SINR of the target IFC is lower than SINR (i.e. higher interference) of the original channel, the subscriber terminal may operate at too high a PER when it jumps to the target IFC. Conversely, a terminal may fail to consider its ability to jump to an IFC operating at a higher SINR (i.e. less interference) and higher SYMCOD.

This IFC transitioning problem manifests itself in various settings. For example, in satellite systems having a rain adaptation feature, a terminal reduces the SYMCOD whenever a rain fade is detected to account for the lower SINR caused by the attenuation in signal power. For example, a terminal operating at a 4.096 Msps IFC may drop down to a 1.024 Msps or lower IFC. As the terminal transits channels, it is vital that the SINR of the transit IFC be known to allow correct IFC allocation. Otherwise, packet loss may occur.

As another example, when a terminal operates at an initial SINR with enough SINR margin to operate at a higher SYMCOD, it will try to operate at a higher SYMCOD by switching to a different IFC. However, if the higher SYMCOD target IFC has a lower SINR (i.e. higher interference level), the SINR margin may be insufficient to operate at the higher SYMCOD. When the terminal switches to the target IFC and sees the high packet loss and low SINR, the terminal switches to a lower SYMCOD rate channel. The terminal again sees excess SINR and this problem iteratively repeats itself.

Accordingly, it is important for a terminal to account for the difference in SINR of the channels (in addition to SYMCOD) before deciding to change channels.

The conventional method of addressing this problem relies on manual use of a spectrum analyzer at the gateway. Under this conventional approach, the spectrum analyzer is used to measure the spectrum of each IFC manually, and this is followed by manually post processing each of the measured spectrums in attempt to determine the margins for every IFC for every group of inroutes. The determined margins are entered into a calibration table that may be made available to the terminals.

The conventional spectrum analyzer method has many drawbacks. First, it is a cumbersome and manual-labor intensive process, particularly when measuring all satellite bands, spot beams, and polarizations. Further, the method is limited to measuring the spectrum of a small subset of terminals. Additionally, the conventional method requires that all the user terminals operating in a band be barred from transmission to have an accurate representation of the noise and interference present in the band that is being calibrated, thereby preventing the user terminals from accessing the internet. Further, still, the process is ill-suited for the frequent system recalibrations desired due to 1) the dynamic nature of interference caused by sources other than thermal noise, and 2) changes in the satellite system configuration.

SUMMARY

Systems and methods are provided in various embodiments for satellite noise and interference calibration using terminal measurements. In one embodiment, a method includes: instructing a satellite terminal to measure the signal to interference-plus-noise ratio (SINR) of an inroute frequency channel (IFC); receiving the SINR measurement corresponding to the IFC; and determining a SINR offset calibration for the IFC based on the SINR measurement. In a particular implementation of this embodiment, the method may further include instructing a second satellite terminal to measure the SINR of the IFC; receiving the second SINR measurement corresponding to the IFC; determining the SINR offset calibration for the IFC based on the second SINR measurement; and transmitting the SINR offset calibration to the satellite terminals.

In accordance with another embodiment of the technology disclosed herein, a method includes: partitioning a satellite network into a first partition comprising a plurality of terminals and a plurality of inroute frequency channels (IFCs); selecting terminals from the first partition to target one or more of the plurality of IFCs for SINR measurement; and directing each of the selected terminals from the first partition to measure the SINR of the targeted IFCs. In an implementation of this embodiment, the method may further include partitioning the satellite network into a second partition comprising a second plurality of terminals and a second plurality of IFCs; selecting terminals from the second partition to target one or more of the second plurality of IFCs for SINR measurement; and directing each of the selected terminals from the second partition to measure the SINR of the targeted IFCs of the second plurality of IFC.

In accordance with another embodiment of the technology disclosed herein, a system includes: a satellite comprising an inroute channel and an outroute channel; and a satellite gateway (SGW) configured to: instruct a plurality of terminals over the outroute channel to measure the SINR of a plurality of IFC corresponding to a satellite network partition; and receive the SINR measurements over the inroute channel. In an implementation of this embodiment, the SGW is further configured to determine SINR offset calibrations for the plurality of IFC based on the received SINR measurements.

In accordance with yet another embodiment of the technology disclosed herein, a methods includes: partitioning a satellite network into a partition comprising a plurality of terminals and a plurality of inroute frequency channels (IFCs); instructing the plurality of terminals to measure the SINR of the plurality of IFCs; processing the plurality of SINR measurements to compute normalized IFC measurements for each of the plurality of terminals; and processing the normalized IFC measurements for each terminal to compute final calibrated IFC SINR offsets for each IFC of the partition. In an implementation of this embodiment, the method further includes normalizing the final calibrated IFC SINR offsets with respect to a lowest SINR offset IFC.

In accordance with yet another embodiment of the technology disclosed herein, a system includes: one or more processors; and one or more non-transitory computer-readable mediums operatively coupled to at least one of the one or more processors and having instructions stored thereon that, when executed by at least one of the one or more processors, cause at least one of the one or more processors to: compute initial statistics for a plurality of inroute frequency channels (IFCs) SINR measurements made by a plurality of terminals; normalize the SINR measurements for each terminal; and determine clear channels of the plurality of IFC based on the normalized SINR measurements. In an implementation of this embodiment, the instructions when executed by at least one of the one or more processors, further cause at least one of the one or more processors to determine final calibrated IFC SINR offsets for each of the plurality of IFCs.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 5 is a table illustrating a particular implementation of operations of the method of FIG. 4.

FIG. 7 is another table illustrating a particular implementation of operations of the method of FIG. 4.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Various embodiments of the systems and methods disclosed herein provide techniques for a terminal in a satellite network system to account for the SINR offset when switching from one IFC to another IFC. Certain of these techniques may include using a plurality of terminals of the satellite network system to perform a ranging process that automatically measures the SINR of a different IFC. From these measurements, a normalized SINR offset calibration may be determined for each channel. The normalized calibration offsets may be made available to each of the terminals. During subsequent operation, the terminals may consider the amount of interference present in an IFC before switching to the channel.

As noted above, for inroute transmissions from a terminal to a satellite, the uplink frequency band is partitioned into subband channels known as inroute frequency channels (IFC). Because each IFC operates at a different frequency, the interference levels (and therefore SINR) of each channel may be different. Accordingly, as a terminal switches channels, the SINR offset is an important consideration for determining whether the terminal will operate at an acceptable quality of service. In various embodiments, the disclosed technique may be implemented in any single or multi-satellite network, with any number of spot beams and terminal groups, to automatically calculate the SINR offset of the IFC of the satellite network.

The disclosed technique provides numerous benefits over conventional methods of determining the SINR offsets of the IFC. First, the disclosed technique adds no additional cost to operating the satellite network as it utilizes available terminals to measure the SINR of the IFC. Second, the disclosed technique automates the process of measuring the SINR of the IFC by utilizing the available terminals' ranging capabilities. Third, the disclosed technique may be used to gather SINR data rapidly for all IFC for a large number terminals, thereby insuring a reliable sample size of measurements. Finally, implementation of the disclosed technique adds no noticeable service degradation for the subscribers of the terminals.

Figure 1:
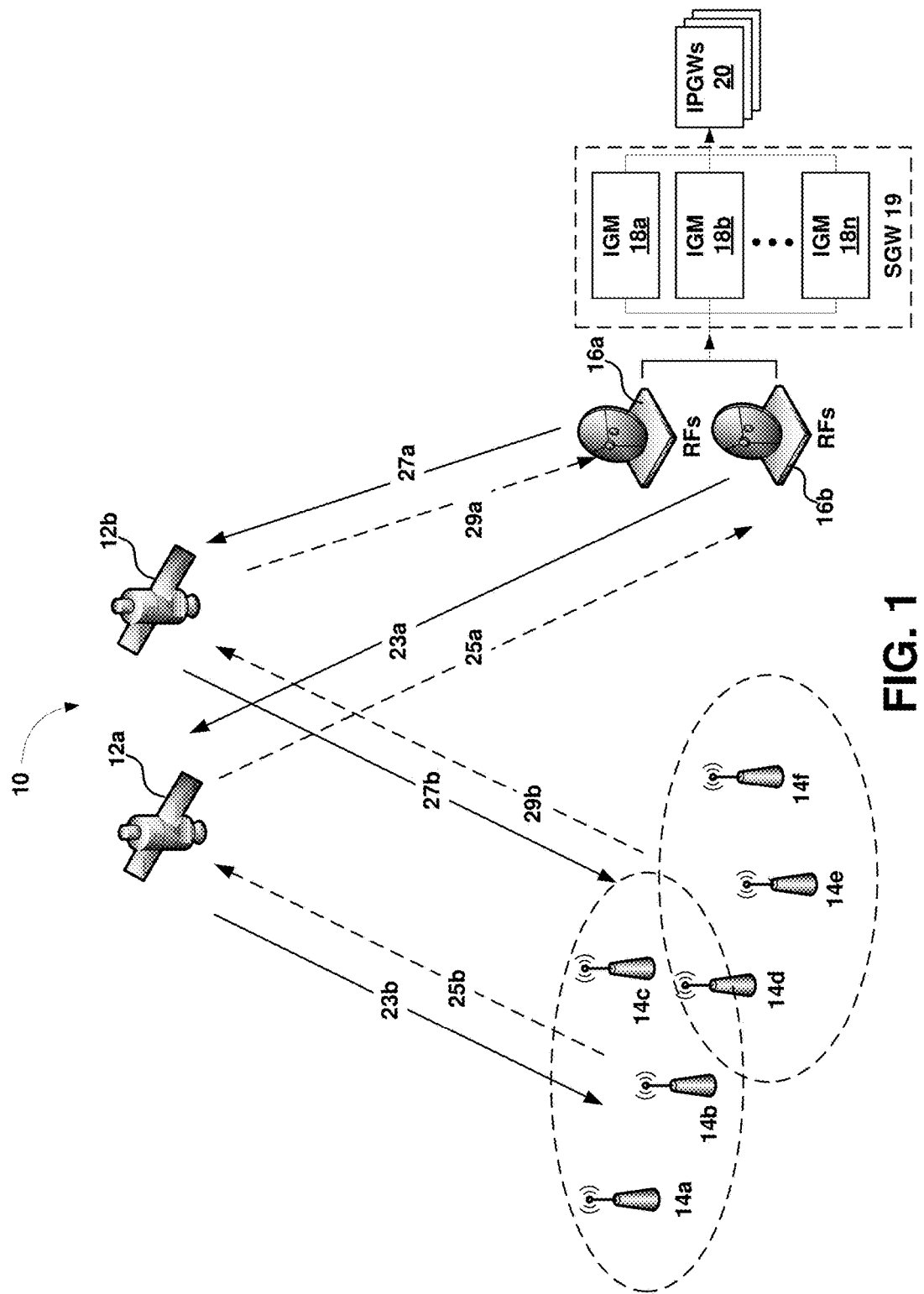
FIG. 1 illustrates an example multi-satellite data transmission system in which various embodiments of the disclosure may be implemented.

FIG. 1 illustrates an example satellite network 10 in which elements involved in inroute communications/traffic are described. Satellite network 10 in this example can include multiple satellites 12a and 12b, remote terminals 14a-14f, radio frequency (RF) terminals 16a and 16b, multiple inroute group managers (IGMs) 18a, 18b, . . . 18n, satellite gateway (SGW) 19, and IP gateways (IPGWs) 20. The satellite network may be a shared access broadband network. Other types of shared access networks may include, for example, wireless networks such as 4$^{th}$ Generation Long Term Evolution (4G LTE) and WiMAX networks, which may include terminals other than Very Small Aperture Terminals (VSATs), such as cellular and WiFi equipped devices.

Feeder links may carry data between RF terminals 16a and 16b and satellites 12a and 12b, and may include: forward uplinks 23a and 27a for transmitting data from RF terminals 16a and 16b to satellites 12a and 12b, respectively; and return downlinks 25a and 29a for transmitting data from satellites 12a and 12b, respectively, to RF terminals 16a and 16b. User links may carry data between satellites 12a and 12b and remote terminals 14a-14f, and may include: return uplinks 25b and 29b for transmitting data from remote terminals 14a-14f to satellites 12a and 12b, respectively; and forward downlinks 23b and 27b for transmitting data from satellites 12a and 12b, respectively, to remote terminals 14a-14f. Forward uplinks 23a, 27a and forward downlinks 23b, 27b may form an outroute, and return uplinks 25b, 29b and return downlinks 25a, 29a may form an inroute. SGW 19 may include high capacity earth stations with connectivity to ground telecommunications infrastructure. SGW 19 may be communicatively connected to RF terminals 16a and 16b. RF terminals 16a and 16b may be the physical equipment responsible for sending and receiving signals to and from satellites 12a and 12b, respectively, and may provide air interfaces for SGW 19/IPGWs 20.

Satellites 12a and 12b may be any suitable communications satellites. For example, satellites 12a and 12b may be bent-pipe design geostationary satellites, which can accommodate innovations and variations in transmission parameters, operating in the Ka-band, Ku-band, or C-band. Satellites 12a and 12b may use one or more spot beams as well as frequency and polarization reuse to maximize the total capacity of satellite network 10. Signals passing through satellites 12a and/or 12b in the forward direction may be based on the DVB-S2 standard (ETSI EN 302 307) using signal constellations up to and including at least 32-APSK. The signals intended to pass through satellites 12a and 12b in the return direction (from terminals 14a-14f) may be based on the Internet Protocol over Satellite (IPoS) standard (ETSI TS 102 354). Other suitable signal types may also be used in either direction, including, for example higher data rate variations of DVB-S2.

IPGWs 20 may be an ingress portion of a local network. IP traffic, including TCP traffic, from the internet may enter an SGW 19 through IPGWs 20. IPGWs 20 may each include a spoofer, which may acknowledge IP traffic, including TCP traffic sent to SGW 19. Moreover, SGW 19 may be connected to an internet through IPGWs 20. IP traffic, including TCP traffic, from the internet may enter SGW 19 through IPGWs 20. As illustrated in FIG. 1, multiple IPGWs may be connected to a single IGM. The bandwidth of RF terminals 16a and 16b can be shared amongst IPGWs 20. At each of IPGWs 20, real-time (RT) and NRT traffic flows may be classified into different priorities. These traffic flows may be processed and multiplexed before being forwarded to priority queues at SGW 19. RT traffic may go directly to an RT priority queue or SGW 19, while NRT traffic flows may be serviced based on the respective priority and volume. Data may be further packed into DVB-S2 code blocks and stored in a code block buffer before transmission.

Data from an internet intended for remote terminals 14a-14f (e.g., VSATs) may be in the form of IP packets, including TCP packets and UDP packets, or any other suitable IP packets, and may enter SGW 19 at any one of IPGWs 20, where the respective spoofer may send an acknowledgment back to the sender of the IP packets. The IP packets may be processed and multiplexed by SGW 19 along with IP packets from other IPGWs, where the IPGWs may or may not have the same service capabilities and relative priorities. The IP packets may then be transmitted to satellites 12a and 12b on forward uplinks 23a and 27a using the air interfaces provided by RF terminals 16a and 16b. Satellites 12a and 12b may then transmit the IP packets to the VSATs using forward downlinks 23b and 27b. Similarly, IP packets may enter the network via the VSATs, be processed by the VSATs, and transmitted to satellites 12a and 12b on return uplinks 25b and 29b. Satellites 12a and 12b may then send these inroute IP packets to the SGW 19/IP-GWs 20 using return downlinks 25*a* and 29*a*.

Each of remote terminals 14*a*-14*f* can be, for example, VSATs and may connect to the Internet through satellites 12*a* and 12*b* and IPGWs 20/SGW 19. For example, remote terminal 14*a* may be used at a residence or place of business to provide a user with access to the Internet. VSATs or Mobile Satellite Terminals (MSTs), may be used by end users to access the satellite network, and may include a remote satellite dish for receiving RF signals from and transmitting RF signals to satellite 12*a*, as well as a satellite modem and other equipment for managing the sending and receiving of data. They may also include one or more remote hosts, which may be computer systems or other electronic devices capable of network communications at a site.

At SGW 19, one or more IGMs can be implemented (IGMs 18*a*, 18*b*, . . . 18*n*). These IGMs may be bandwidth controllers running bandwidth allocation algorithms. The IGMs may manage bandwidth of the remote terminals 14*a*-14*f* in the form of inroute groups (IGs), based in part on bandwidth demand requests from the remote terminals 14*a*-14*f*.

For inroute (uplink) transmissions from terminals 14*a*-14*f* to satellites 12*a* and 12*b*, the uplink frequency band of a satellite beam may be split into any number of subband IFC with any number of symbol rates of, for example, 512 ksps, 1 Msps, 2 Msps, 4 Msps, etc. Depending on operating conditions (e.g. weather, status of terminal, status of satellite), a terminal 14*a*-14*f* may attempt to transmit from one IFC to a target IFC with a same, lower, or higher symbol rate.

Because of the varying interference levels amongst the IFC, the signal quality (i.e. SINR) may vary from one channel to the next. In accordance with various embodiments, as will be further described below, the SINR offset of each IFC may be periodically calculated and made available to the terminals. In these embodiments, a terminal operable to transmit in a frequency transits to an IFC of the band if the SINR offset of the IFC is within an acceptable level. For example, a SINR offset may be acceptable for an IFC with a given SYMCOD if the terminal is able to operate in the channel below a predetermined packet error rate.

Figure 2:
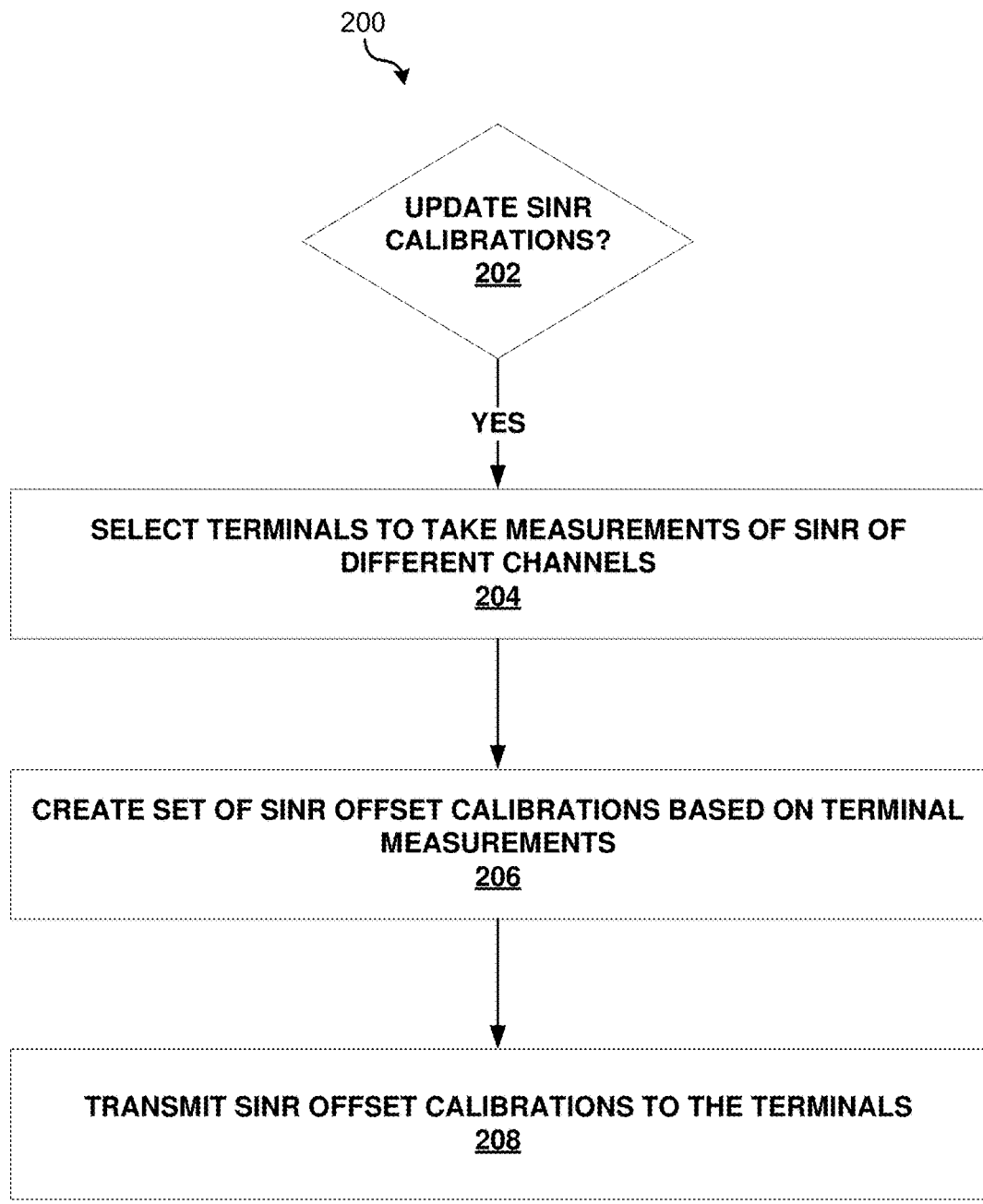
FIG. 2 is an operational flow diagram illustrating an example method for automatically determining calibrated SINR offsets for a plurality of IFC using terminal measurements of the SINR.

FIG. 2 is an operational flow diagram illustrating an example method 200 for automatically determining calibrated SINR offsets for a plurality of IFC using terminals 14*a*-14*f* to make measurements of the SINR. It should be noted that although method 200 is described with reference to example multi-satellite data transmission system 10, the disclosed method may be implemented in any satellite data transmission system comprising any number of satellites, spot beams, polarizations, terminals, terminal groups, and IFCs. It should also be noted that although method 200 is described with reference to a system that has previously been calibrated, it may similarly be implemented in a system that is being calibrated for the first time.

With reference now to method 200, at decision 202 it is determined that the SINR offset calibrations for all or a subset of IFCs need to be updated. In one embodiment, the SINR offset calibrations are periodically updated after a predetermined period of time (e.g. 1 day, 2 days, 4 days, a week, etc.) has passed since the last calibration. The periodic update time may be specified at SGW 19 by an operator of satellite system 10 depending on the expected SINR drift rate of the IFC, weather patterns, the positional drift of satellites 12*a* or 12*b*, and other considerations. In another embodiment, the SINR calibrations are updated if there have been any changes to the configuration of system 10 such as updates to the equipment of terminals 14*a*-14*f*, updates to RF terminals 16, the addition of satellites, changes in polarizations, the addition of outroute or inroute channels utilizing new frequency bands, conversion of a narrow band to a wideband, etc.

After there is a determination that SINR calibrations will be made, at operation 204 some or all of the terminals are selected to perform a ranging process (one or more multiple times) over some or all of the IFC available to them to measure the signal to noise ratio (i.e. SINR) of each IFC. In various embodiments, the terminals may be instructed to take these measurements during times that are least likely to degrade a subscriber's terminal service. For example, each terminal may be directed to measure the SINR of the IFC in the middle of the night (or at some other opportune window) during three separate times. As one having ordinary skill in the art will appreciate, the ranging process for each terminal may be completed in the span of a few seconds or minutes and does not require complete interruption of a terminal's service. For example, if a subscriber terminal provides a user Internet access for home use, the user may still browse the web even as ranging is performed.

In one embodiment, an IGM 18*a-n* of SGW 19 directs one or more of terminals 14*a*-14*f* to measure the SINR of the various IFCs. In this embodiment, the IFC measurements may be transmitted back to IGM 18*a-n* for subsequent calibration by the IGM 18*a-n* or other device. In another embodiment, multiple IGMS may direct terminals of their respective TG to perform the SINR measurements. In this embodiment, a separate set of calibrations may be determined for each TG's set of measurements.

Once the SINR measurements have been made, at operation 206 one or more sets of SINR offset calibrations may be created based on the terminal measurements. For example, in one embodiment, a set of SINR measurements may be normalized with respect to an IFC channel with the highest SINR (highest signal quality). In this embodiment, further described below, the normalized SINR offsets of the IFC channels may be given with respect to the highest SINR IFC. Alternatively, in another embodiment the SINR measurements may be normalized with respect to other references such as, for example, the IFC channel with the lowest SINR (lowest signal quality).

At operation 208, the SINR offset calibrations are subsequently transmitted to the terminals 14*a*-f through the outroute links. In one embodiment, the calibrations are provided to the terminals in a table. In one implementation of this embodiment, for example, a separate SINR offset calibration table may be provided for each TG. Alternatively, the same SINR offset calibration table may be provided to all the terminals. In an alternative embodiment, the SINR offset calibrations may be manually delivered to the terminals using a portable storage drive such as a flash drive. In further embodiments, still, the terminals 14*a*-14*f* may download the SINR offset calibrations from a separate network.

Figure 3:
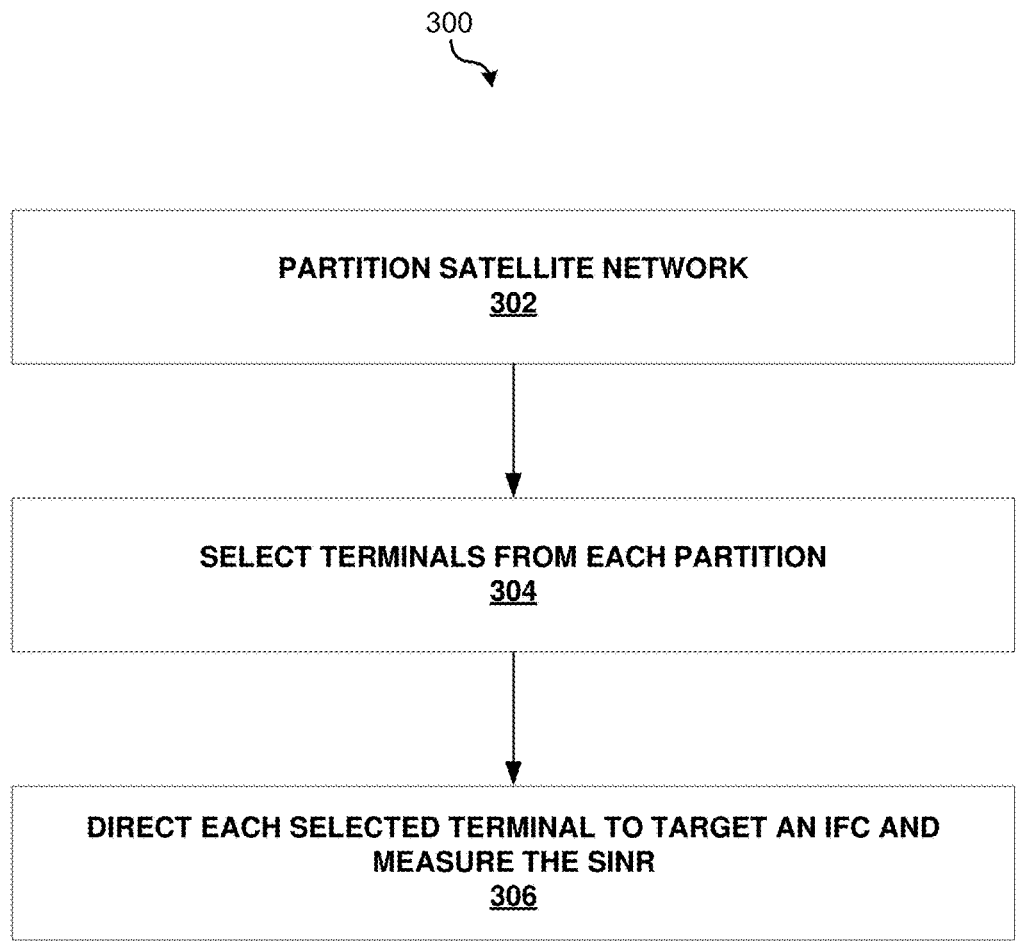
FIG. 3 is an operational flow diagram illustrating an example method of selecting and using the terminals to measure the SINR of different IFC as described in FIG. 2.

FIG. 3 is an operational flow diagram illustrating an example method 300 of selecting the terminals to measure the SINR of different IFC as described in operation 204 of method 200. Prior to directing any terminals to measure the SINR of the IFC, at operation 302 the satellite network is partitioned. For example, a set of terminals from the satellite network may be partitioned based on a shared satellite beam, a shared frequency band, a shared TG, and/or shared application characteristics. At operation 304, a number of terminals from each partition are selected to take SINR measurements. The selection of the terminals may depend on parameters such as the whether the terminals are operating with a clear sky SINR, the number of terminals needed to obtain statistically reliable measurements of SINR, the operational status of the terminal, etc. In one embodiment, terminals that satisfy some or all of these parameters are randomly selected up to a given number. In an alternative embodiment, SINR measurements are taken for all operational terminals of a given partition.

As an example, consider the case where a satellite network partition is based on a frequency band including 20 different channels and a set of 100 terminals sharing a common modem. From this partition, a terminal is selected to take SINR measurements if, for example, the terminal is operating with a satisfactory clear sky SINR and does not have any other operational issues. As another example, a satellite network partition may be based on a satellite beam covering 50 different channels and including a set of 200 terminals sharing similar modems.

At operation 306, the selected terminals are directed to target any number of IFCs of their respective band partition and measure the SINR of each targeted IFC (i.e. perform ranging). For example, a given terminal may be directed to measure the SINR of the IFC by sequentially transitioning between the channels in order of increasing or decreasing frequency. The measurements may be stored at the terminal and subsequently transmitted in the inroute toward SGW 19 for processing.

In one embodiment, the terminals measure each targeted IFC multiple times to reduce measurement errors, minimize any local weather condition that may affect the SINR measurements, and otherwise generate statistically reliable measurements. In implementations of this embodiment, the measurements may be spread over various times. For example, a terminal may make a set of 4 IFC SINR measurements at 1 a.m., 2 am, and 3 a.m., and 4 a.m. In this example, taking the measurements over a period of three hours helps average out any temporal sources of error. Additionally, any issues related to degradation of a subscriber's service are avoided by taking the measurements during the late night (i.e. low usage hours).

Figure 4A:
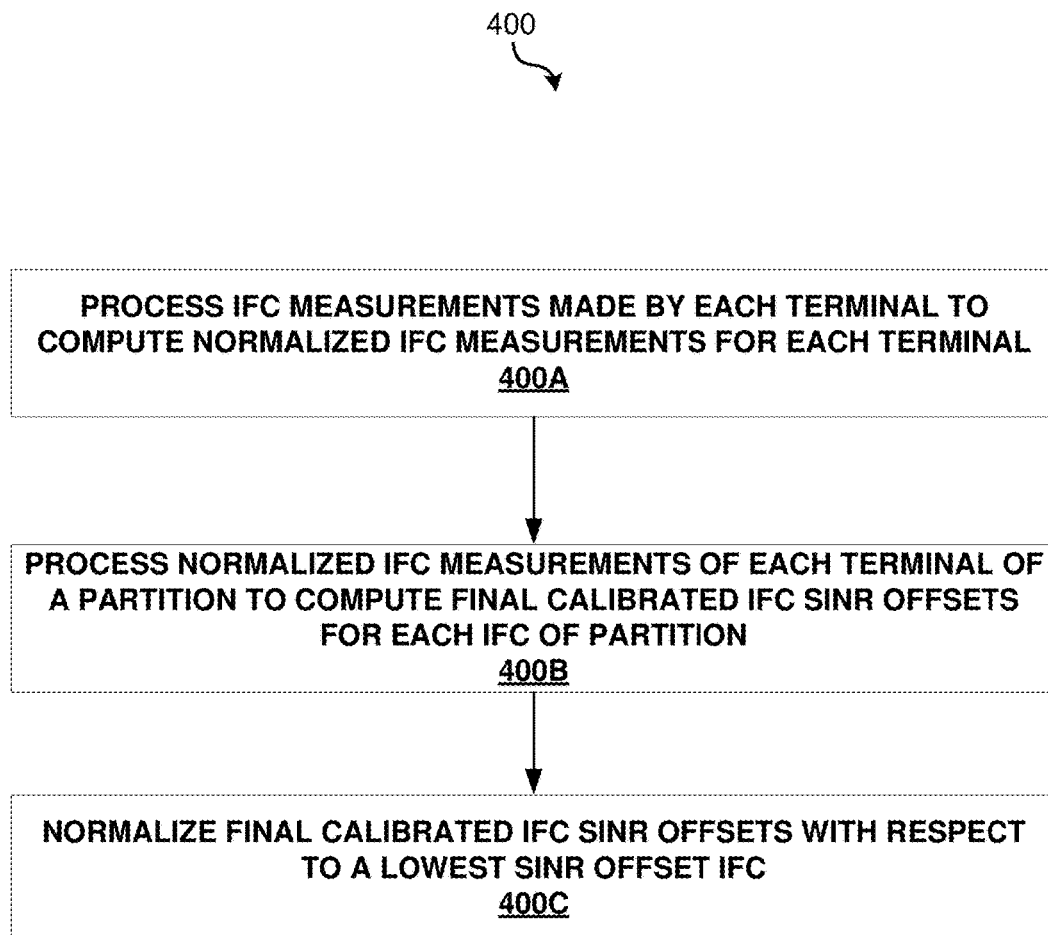
FIG. 4A is an operational flow diagram illustrating an example method of determining a normalized set of SINR offset calibrations for a partition based on SINR measurements performed by a set of terminals of the partition.

As previously described in operation 206 of FIG. 2, after measuring the SINR of the IFC, a set of calibration SINR offsets may be determined. An example implementation of this functionality is described with reference to FIGS. 4A-4C, which illustrate a method 400 for determining a normalized set of SINR offset calibrations for a partition based on SINR measurements performed by a set of terminals of the partition. In various embodiments, method 400 may be performed for a set of satellite partitions to determine a normalized set of SINR offset calibrations for each partition.

Figure 5:
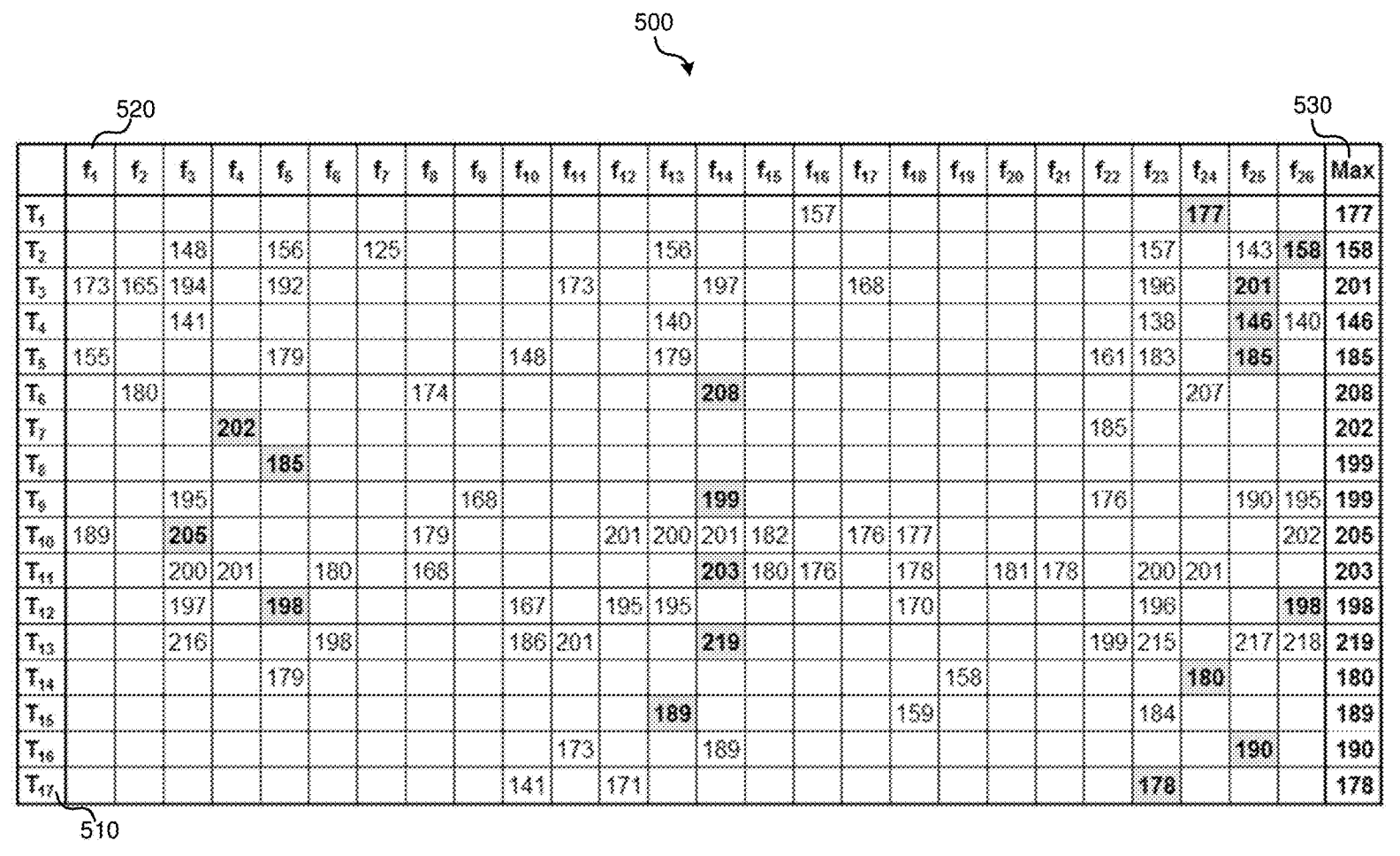
Figure 6:
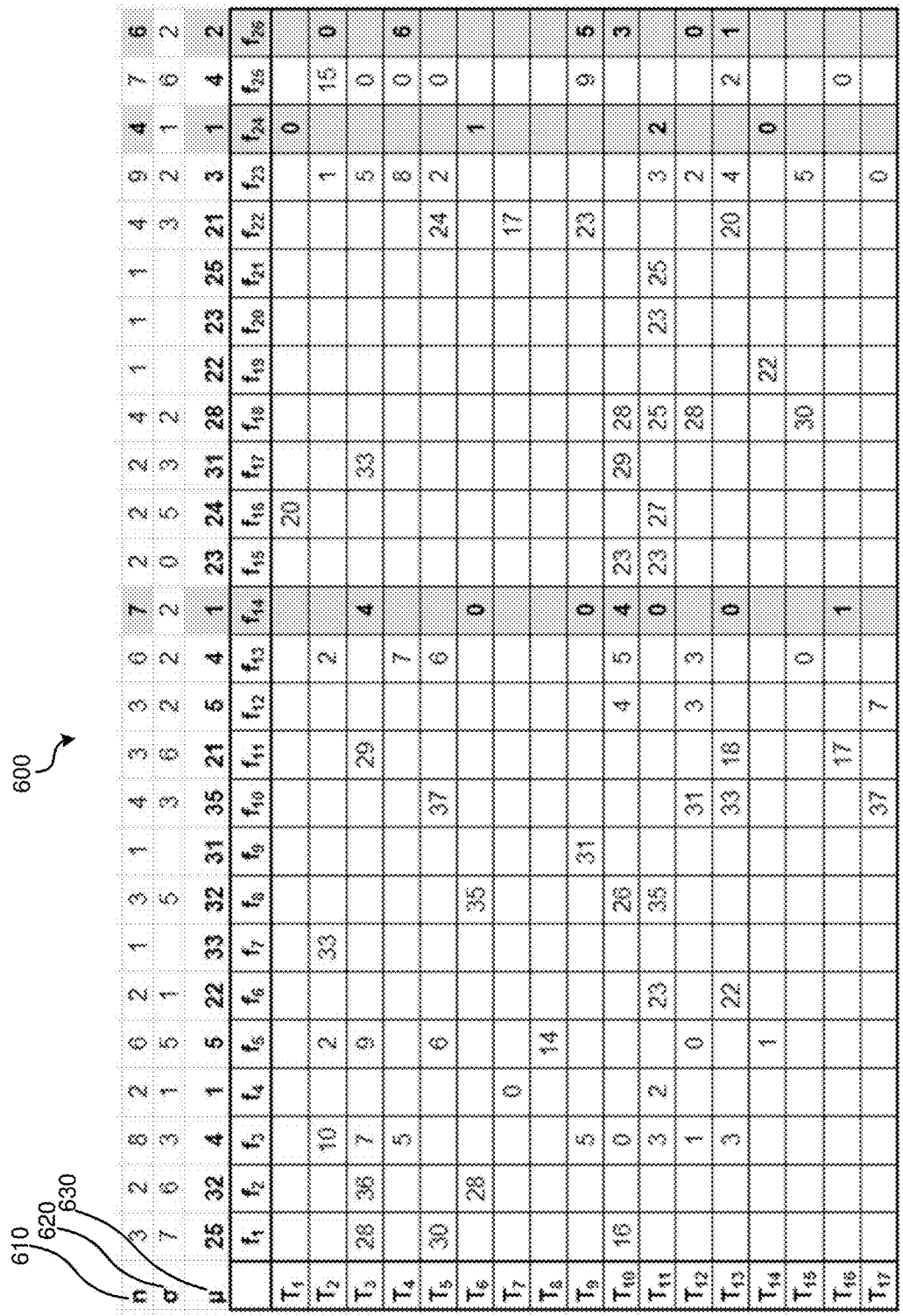
FIG. 6 is another table illustrating a particular implementation of operations of the method of FIG. 4.
Figure 7:
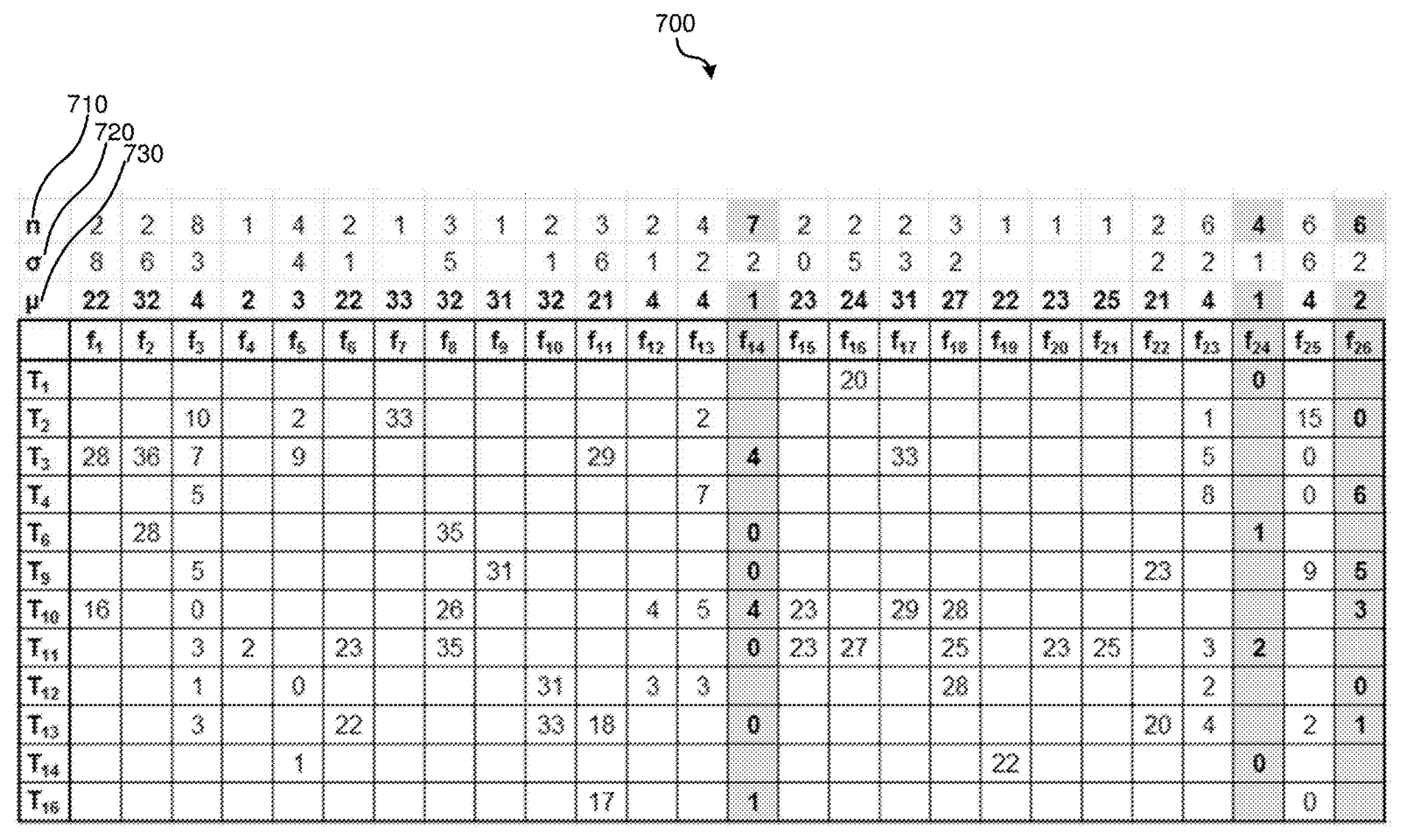

Method 400 will be described with reference to FIGS. 5-7, which are tables illustrating a particular implementation of method 400 for a group of 17 terminals that took measurements over a 26-channel frequency band. The tables list values in units of centibels (cB), i.e. 0.1 decibels (dB). It is worth noting that FIGS. 5-7 are provided for the purpose of illustration only, and are not meant to limit the technology disclosed herein. In particular, method 400 may be implemented for any number of terminals, frequency channels, and partitions. Furthermore, other suitable statistical methodologies may be implemented in place of those described with reference to FIGS. 5-7.

Figure 4B:
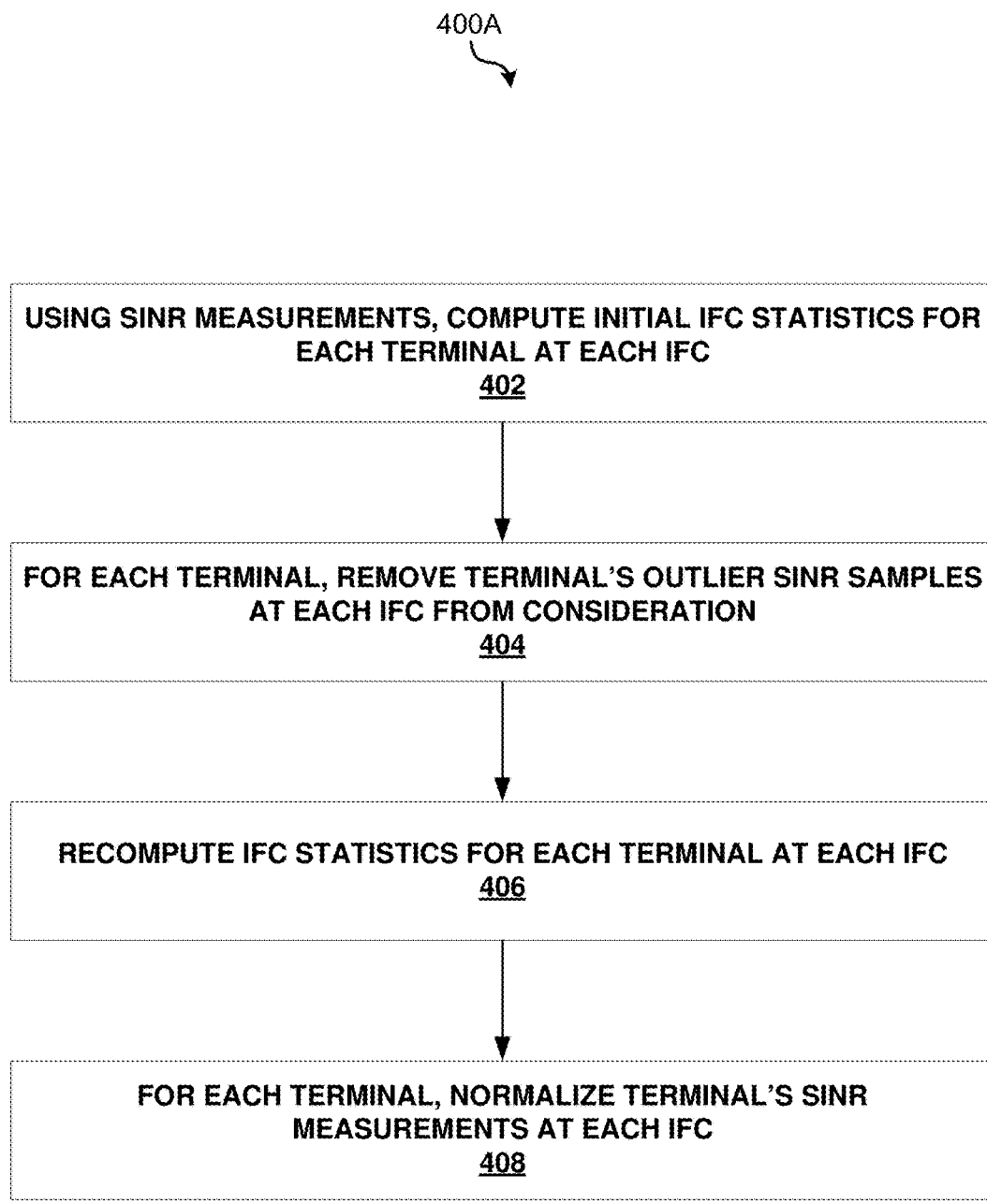
FIG. 4B is an operational flow diagram illustrating an example method of processing IFC measurements made by each terminal to compute normalized IFC measurements.

With reference now to method 400, at operation or method 400A, the IFC measurements made by each terminal are processed to compute normalized IFC measurements. FIG. 4B illustrates method 400A in greater detail. At operation 402 the SINR measurements are used to compute initial IFC statistics. In one embodiment, the initial IFC statistics are computed by taking the average of the SINR measurements for each channel by each terminal. At operation 404, for each terminal outliner SINR measurements at each IFC may be removed from consideration. In one implementation, outliers may be removed if they exceed a predetermined number of standard deviations from the average (e.g. 0.5, 1, 1.5, 2, 3, etc.). In other implementations, outliers may be removed based on the interquartile range of the measurements.

At operation 406, the IFC statistics are recomputed following the removal of outliers. In one embodiment, the IFC statistics are computed by taking the average of the SINR measurements for each channel by each terminal without the outliers. For example, if a terminal made the SINR measurements 130 cB, 129 cB, 131 cB, and 180 cB for a given channel, then the 180 cB measurement may be removed (operation 404) to arrive at an average SINR of 130 cB (operation 406). In additional embodiments, operations 404 through 406 may be iteratively repeated to remove outliers from the recomputed statistics. Alternatively, in other embodiments operations 404 and 406 may be skipped.

Table 500 of FIG. 5 illustrates an example table of SINR measurements after operations 402-406 are performed for a 17 terminal and 26 IFC partition. As illustrated, each row of table 500 corresponds to a terminal 510 ($T_1$ through $T_{17}$), and each column of table 500 corresponds to an IFC 520 ($f_1$ through $f_{26}$). Table 500 additionally comprises a maximum SINR column 530 that lists the maximum SINR determined for a terminal 510. For example, for terminal $T_5$, the maximum SINR is 185 cB as measured on IFC $f_{25}$. As illustrated by table 500, there may be considerable variation in the SINR across different IFC.

At operation 408, for each terminal, the SINR measurements are normalized. In one embodiment, the SINR measurements are normalized for a given terminal by subtracting the terminal's IFC SINRs from the terminal's maximum IFC SINR, thereby creating normalized SINR offsets for each channel. The application of this embodiment is illustrated with reference to FIGS. 5 and 6. Consider terminal T16 as an example. As shown in table 500, the measured SINRs are 173 cB on IFC $f_{11}$, 189 cB on IFC $f_{14}$, and 190 cb on IFC $f_{25}$. The maximum SINR is 190 cB. As shown in table 600, after normalization based on the highest SINR, the normalized SINR offsets of these channels are 17 cB, 1 cB, and 0 cB, respectively.

One benefit provided by this normalization operation is that it accounts for terminals located at various locations with varying antenna attenuations. For example, a terminal located near the edge of a satellite beam will have a lower SINR across all channels as compared to a terminal located near the center of the beam. By performing normalization operation 408, these two terminals may be compared based on their SINR offsets.

Figure 4C:
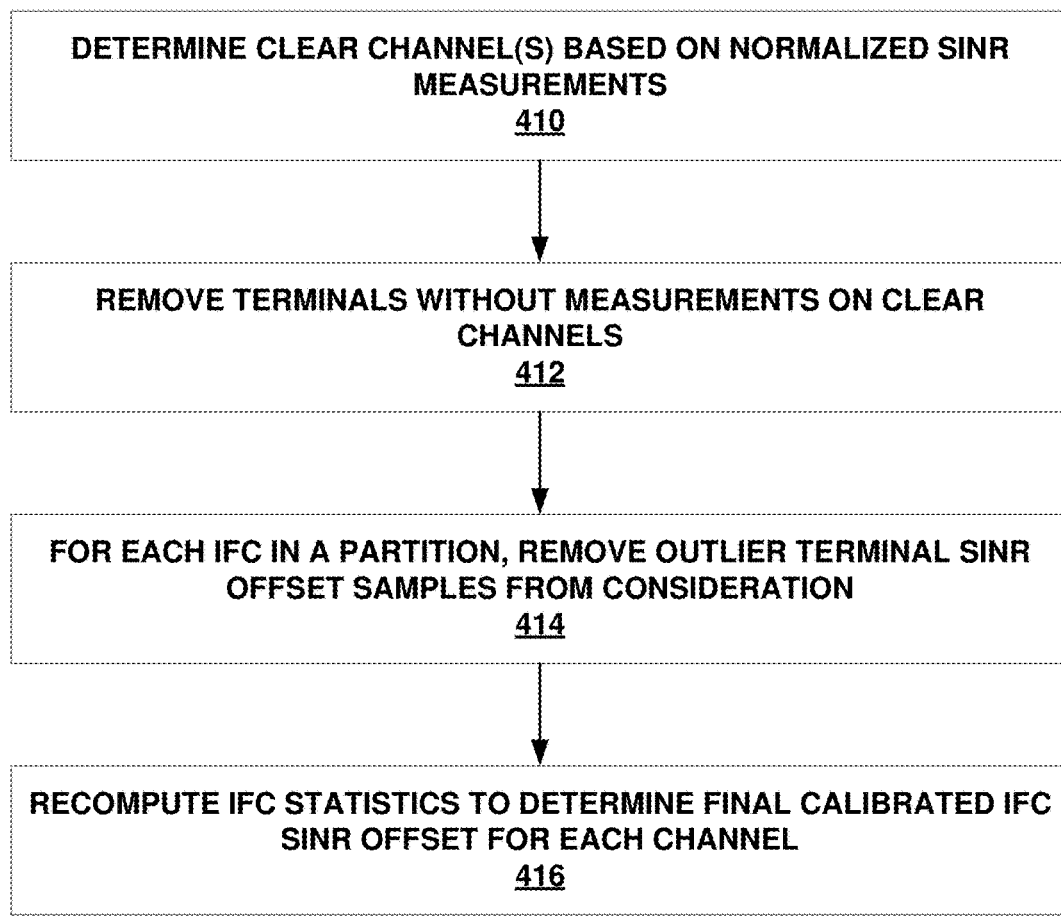
FIG. 4C is an operational flow diagram illustrating an example method of processing normalized IFC measurements of each terminal of a partition to compute final calibrated IFC SINR offsets for each channel of the partition.

With reference again to method 400, at operation 400B the normalized IFC measurements of each terminal of a partition are processed to compute final calibrated IFC SINR offsets for each IFC of the partition. FIG. 4C illustrates method 400B in greater detail. At operation 410, one or more clear channels are determined based on the normalized SINR offsets. As used herein, the term "clear channels" refers to the IFCs with the lowest interference levels (highest SINRs) on a frequency band or partition. In one embodiment, clear channels are determined by selecting the IFCs with an average SINR offset below a predetermined value. In one particular embodiment, an IFC must have an average SINR offset below 1 cB to be selected as a clear channel. In implementations of this embodiment, an IFC is selected as a clear channel only if it has a minimum number of terminals that have measurements on the IFC (e.g. at least 3 or 4.) In further embodiments, outliers are removed from an IFC's set of SINR offsets prior to determining the average SINR offset for the IFC.

Table 600 of FIG. 6 illustrates an example table of SINR offsets and IFC statistics after clear channels are determined. As illustrated, the IFC statistics of table 600 include for each IFC the sample size 610 (number of terminals with measurements on that channel), the average SINR offset 630, and the standard deviation 620 of the IFC's set of offsets. In this example implementation, an IFC is selected as a clear channel if its average SINR offset is below 3 cB and its sample size of measurements is at least 3. In this example, three IFC ($f_{14}$, $f_{24}$, and $f_{26}$) satisfy the clear channel criteria. By comparison, $f_4$ does not satisfy the criteria of a clear channel in this example because it only has two sample measurements.

At operation 412, terminals without measurements on the clear channels are removed from consideration. Accordingly, in subsequent operations of method 400 only terminals that have SINR offset values on clear channels are considered. In table 600, for example, terminals $T_5$, $T_7$, $T_8$, $T_{15}$, and $T_{17}$ do not have any measurements on any clear channel. Accordingly, these terminals do not appear in table 700 of FIG. 700, which illustrates a particular implementation of subsequent operations of method 400.

At operation 414, for each IFC of the partition, outlier terminal SINR offset samples are removed from consideration. In one implementation of this embodiment, the population average SINR offset, i.e. the average of all SINR offset measurements determined for all terminals for an IFC, is computed. Subsequently, any terminal SINR offset that is an outlier relative to this population average is removed. Consider for example, the implementation where outliers are removed if they exceed 2 standard deviations. If the population average SINR offset for a given IFC is 4 cB and the standard deviation is 1 cB, then terminals with a SINR offset that is not between 2 cB and 6 cB will not be considered for that IFC in subsequent operations of method 400B. In alternative embodiments, operation 414 may be skipped.

After the terminals are removed from consideration, and statistical sample outliers are removed, at operation 416 the IFC statistics are recomputed to determine the final calibrated IFC SINR offset for each channel. In one embodiment, the IFC statistics are recomputed by taking the means and standard deviations of each IFC's offset SINR values. Table 700 illustrates one such implementation of this embodiment. As illustrated, the recomputed IFC statistics of table 700 include for each IFC the sample size 710 (number of terminals with measurements on that channel), the average SINR offset 730, and the standard deviation 720 of the IFC's set of offsets. Consider IFC $f_{14}$ as an example. The average SINR offset of $f_{14}$ is 1 cB with a standard deviation of 2 cB.

At operation 400C of method 400, the final calibrated IFC SINR offsets for each channel of a partition are normalized with respect to a lowest SINR offset IFC. Consider Table 700 as an example. The lowest IFC offset has a mean of 1 cB. Accordingly, the IFC offsets may be normalized with respect to 0 by subtracting 1 off all of the means.

In one embodiment, the final calibrated IFC offset for each channel of a frequency band partition may be expressed as Equation (1):

$$\text{Offset}_{ifc} = \text{IFC}_{mean} + K*\text{IFC}_{std} \quad (1)$$

Where $\text{IFC}_{mean}$ is the mean of the IFC's offset SINR values, $\text{IFC}_{std}$ is the standard deviation of those values, and K is a constant between 0 and 5. In various embodiments, the value of K may be selected depending on the desired confidence of the SINR offset calibration of the channels.

Following determination of the calibrated IFC SINR offsets, they may be made available to the terminals in a suitable format. For example, in one embodiment the IFC SINR offsets may be transmitted to a terminal in a calibration table containing mean and standard deviation SINR offsets for each channel of a frequency band the terminal operates on. Accordingly, when transitioning from one IFC to another, a terminal may account for differences in the SINR between the IFC. In further embodiments, the calibrated IFC SINR offsets determined for each partition may be concatenated into a single file (e.g., a calibration table in one file). Alternatively, the calibrated IFC SINR offsets determined for each partition may be transmitted separately (e.g., in separate calibration tables in separate files).

Figure 8:
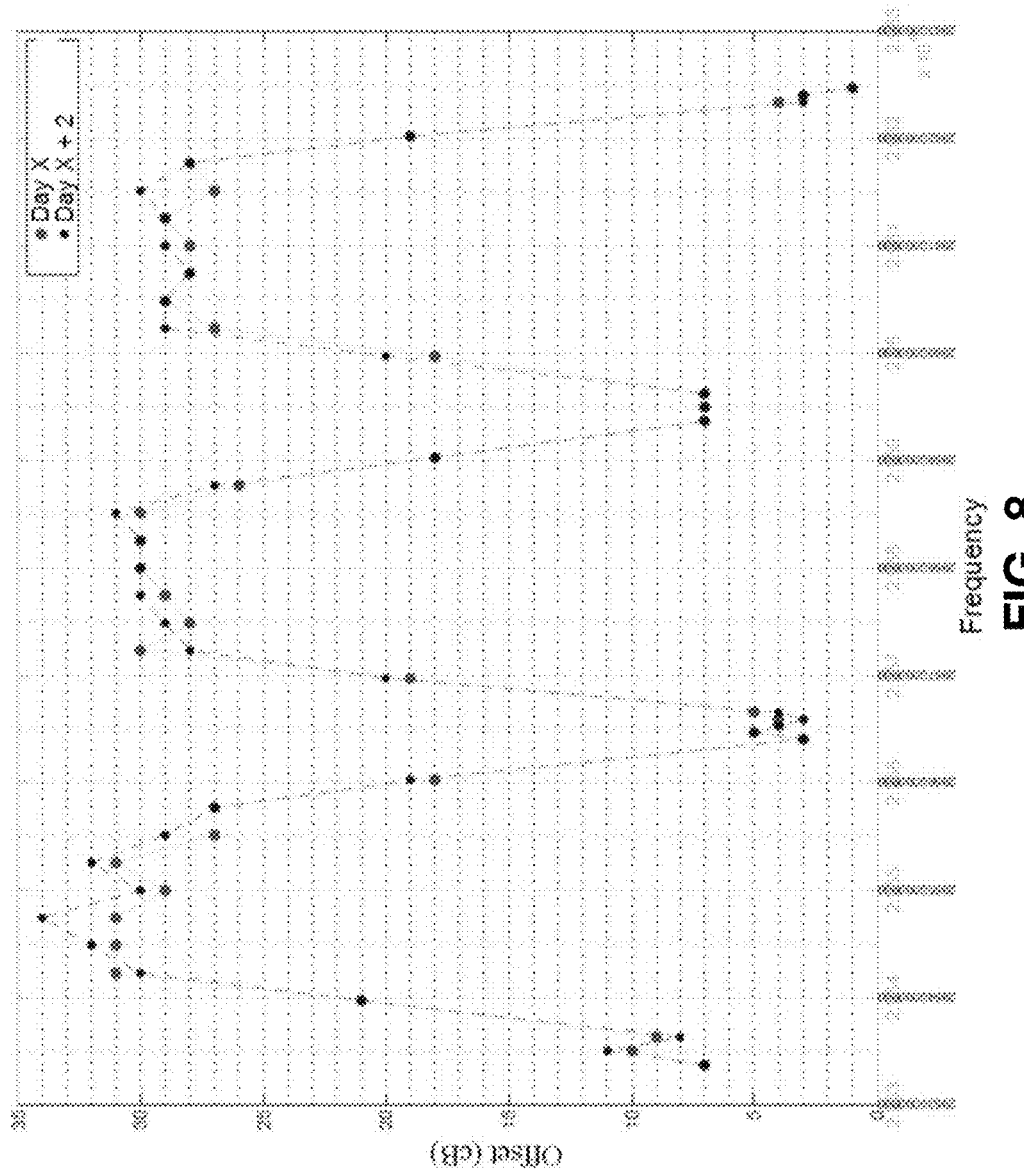
FIG. 8 is a plot illustrating an example inroute calibration mapping for a satellite beam created by applying the methods disclosed herein.

FIG. 8 is a plot illustrating an example inroute calibration mapping for a satellite beam created by applying the methods disclosed herein. The plot shows the calibrated offset values in cB as a function of frequency. There are two curves shown for computed calibrated results for data collected on a beam 2 days apart. As illustrated, the calibration offsets are fairly consistent over the course of a few days.

Figure 9:
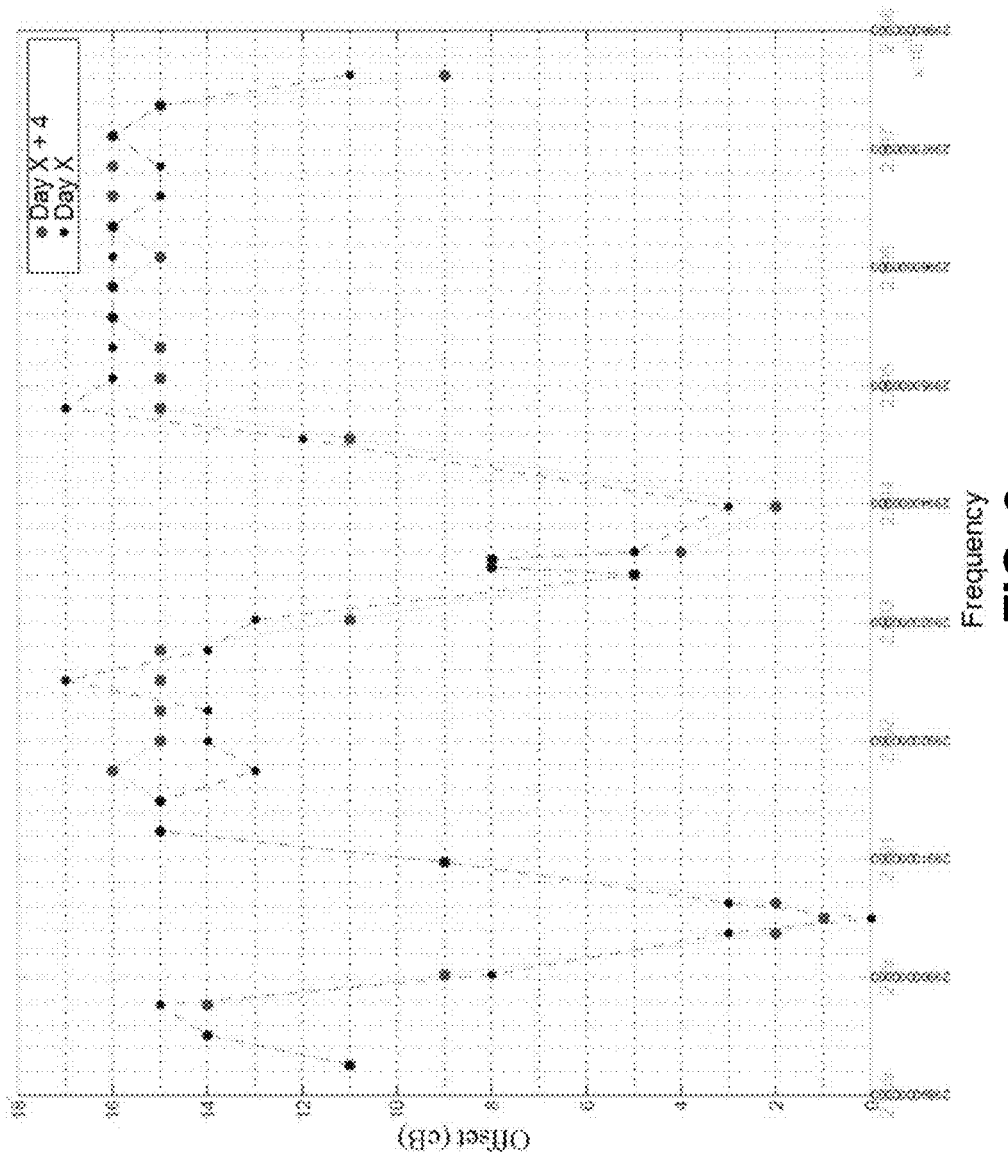
FIG. 9 is another plot illustrating another example calibration mapping for another satellite beam created by applying the methods disclosed herein.

FIG. 9 is another plot illustrating another example calibration mapping for another satellite beam created by applying the methods disclosed herein. There are two curves shown for computed calibrated results for data collected on a beam 4 days apart. As illustrated, the calibration offsets are fairly consistent over the course of several days.

Figure 10:
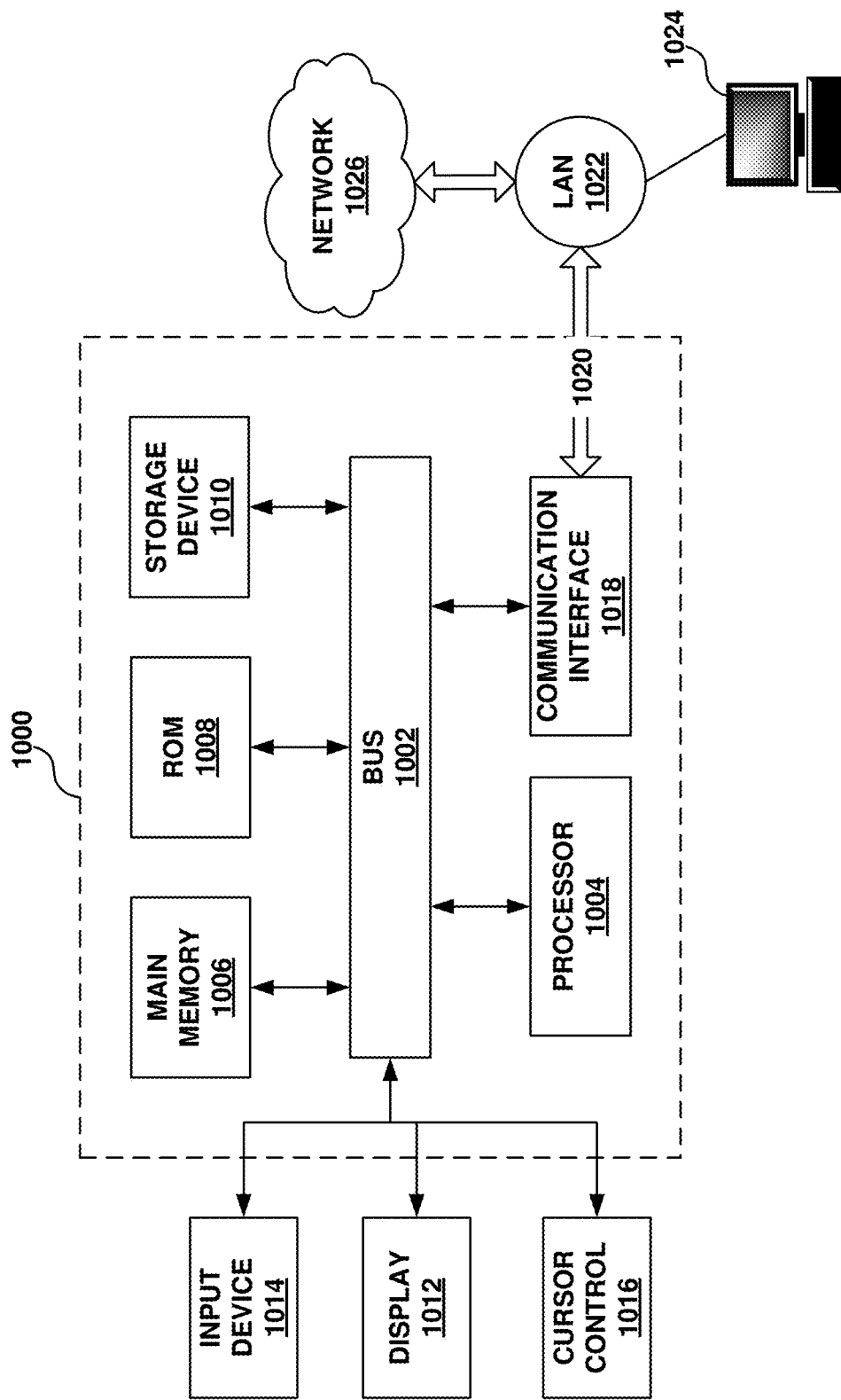
FIG. 10 illustrates an example computing module that may be used in implementing features of various embodiments.

FIG. 10 illustrates a computer system 1000 upon which example embodiments according to the present disclosure can be implemented. Computer system 1000 can include a bus 1002 or other communication mechanism for communicating information, and a processor 1004 coupled to bus 1002 for processing information. Computer system 1000 may also include main memory 1006, such as a random access memory (RAM) or other dynamic storage device, coupled to bus 1002 for storing information and instructions to be executed by processor 1004. Main memory 1006 can also be used for storing temporary variables or other intermediate information during execution of instructions to be executed by processor 1004. Computer system 1000 may further include a read only memory (ROM) 1008 or other static storage device coupled to bus 1002 for storing static information and instructions for processor 1004. A storage device 1010, such as a magnetic disk or optical disk, may additionally be coupled to bus 1002 for storing information and instructions.

Computer system 1000 can be coupled via bus 1002 to a display 1012, such as a cathode ray tube (CRT), liquid crystal display (LCD), active matrix display, light emitting diode (LED)/organic LED (OLED) display, digital light processing (DLP) display, or plasma display, for displaying information to a computer user. An input device 1014, such as a keyboard including alphanumeric and other keys, may be coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to one embodiment of the disclosure, satellite noise and interference calibration, in accordance with example embodiments, are provided by computer system 1000 in response to processor 1004 executing an arrangement of instructions contained in main memory 1006. Such instructions can be read into main memory 1006 from another computer-readable medium, such as storage device 1010. Execution of the arrangement of instructions contained in main memory 1006 causes processor 1004 to perform one or more processes described herein. One or more processors in a multi-processing arrangement may also be employed to execute the instructions contained in main memory 1006. In alternative embodiments, hard-wired circuitry is used in place of or in combination with software instructions to implement various embodiments. Thus, embodiments described in the present disclosure are not limited to any specific combination of hardware circuitry and software.

Computer system 1000 may also include a communication interface 1018 coupled to bus 1002. Communication interface 1018 can provide a two-way data communication coupling to a network link 1020 connected to a local network 1022. By way of example, communication interface 1018 may be a digital subscriber line (DSL) card or modem, an integrated services digital network (ISDN) card, a cable modem, or a telephone modem to provide a data communication connection to a corresponding type of telephone line. As another example, communication interface 1018 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1018 sends and receives electrical, electromagnetic, or optical signals that carry digital data streams representing various types of information. Further, communication interface 1018 may include peripheral interface devices, such as a Universal Serial Bus (USB) interface, a PCMCIA (Personal Computer Memory Card International Association) interface, etc.

Network link 1020 typically provides data communication through one or more networks to other data devices. By way of example, network link 1020 can provide a connection through local network 1022 to a host computer 1024, which has connectivity to a network 1026 (e.g. a wide area network (WAN) or the global packet data communication network now commonly referred to as the "Internet") or to data equipment operated by service provider. Local network 1022 and network 1026 may both use electrical, electromagnetic, or optical signals to convey information and instructions. The signals through the various networks and the signals on network link 1020 and through communication interface 1018, which communicate digital data with computer system 1000, are example forms of carrier waves bearing the information and instructions.

Computer system 1000 may send messages and receive data, including program code, through the network(s), network link 1020, and communication interface 1018. In the Internet example, a server (not shown) might transmit requested code belonging to an application program for implementing an embodiment of the present disclosure through network 1026, local network 1022 and communication interface 1018. Processor 1004 executes the transmitted code while being received and/or store the code in storage device 1010, or other non-volatile storage for later execution. In this manner, computer system 1000 obtains application code in the form of a carrier wave.

The term "computer-readable medium" as used herein refers to any medium that participates in providing instructions to processor 1004 for execution. Such a medium may take many forms, including but not limited to non-volatile media, volatile media, and transmission media. Non-volatile media include, for example, optical or magnetic disks, such as storage device 1010. Volatile media may include dynamic memory, such as main memory 1006. Transmission media may include coaxial cables, copper wire and fiber optics, including the wires that comprise bus 1002. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 11:
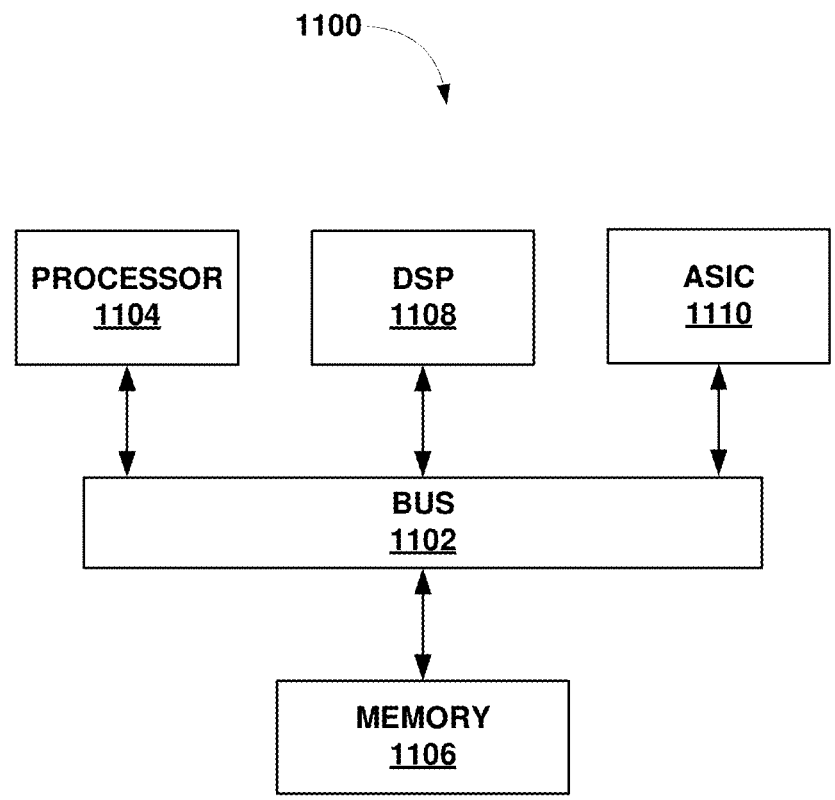
FIG. 11 illustrates an example chip set that can be utilized in implementing architectures and methods for dynamic bandwidth allocation in accordance with various embodiments.

FIG. 11 illustrates a chip set 1100 in which embodiments of the disclosure may be implemented. Chip set 1100 can include, for instance, processor and memory components described with respect to FIG. 11 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1100 includes a communication mechanism such as a bus 1002 for passing information among the components of the chip set 1100. A processor 1104 has connectivity to bus 1102 to execute instructions and process information stored in a memory 1106. Processor 1104 includes one or more processing cores with each core configured to perform independently. A multi-core processor enables multiprocessing within a single physical package. Examples of a multi-core processor include two, four, eight, or greater numbers of processing cores. Alternatively or in addition, processor 1104 includes one or more microprocessors configured in tandem via bus 1102 to enable independent execution of instructions, pipelining, and multithreading. Processor 1004 may also be accompanied with one or more specialized components to perform certain processing functions and tasks such as one or more digital signal processors (DSP) 1108, and/or one or more application-specific integrated circuits (ASIC) 1110. DSP 1108 can typically be configured to process real-world signals (e.g., sound) in real time independently of processor 1104. Similarly, ASIC 1110 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1104 and accompanying components have connectivity to the memory 1106 via bus 1102. Memory 1106 includes both dynamic memory (e.g., RAM) and static memory (e.g., ROM) for storing executable instructions that, when executed by processor 1104, DSP 1108, and/or ASIC 1110, perform the process of example embodiments as described herein. Memory 1106 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 1000. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   one or more processors; and
   one or more non-transitory computer-readable mediums operatively coupled to at least one of the one or more processors and having instructions stored thereon that, when executed by at least one of the one or more processors, cause the system to:
      receive a plurality of signal to interference-plus-noise ratio (SINR) measurements made by a plurality of terminals for a plurality of inroute frequency channels (IFCs);
      normalize the SINR measurements for each of the plurality of terminals, wherein normalizing the SINR measurements for each of the plurality of terminals comprises: for each of the plurality of terminals: determining a difference between each of the terminal's IFC SINR measurements and the terminal's maximum IFC SINR measurement, thereby creating normalized SINR offsets for each IFC;
      determine one or more clear channels of the plurality of IFC using at least the normalized SINR measurements; and
      determine a final calibrated IFC SINR offset for each of the plurality of IFCs.

2. A system, comprising:
   one or more processors; and
   one or more non-transitory computer-readable mediums operatively coupled to at least one of the one or more processors and having instructions stored thereon that, when executed by at least one of the one or more processors, cause the system to:
      compute initial statistics for a plurality of signal to interference-plus-noise ratio (SINR) measurements made by a plurality of terminals for a plurality of inroute frequency channels (IFCs);

normalize the SINR measurements for each of the plurality of terminals;

determine one or more clear channels of the plurality of IFC using at least the normalized SINR measurements; and determine a final calibrated IFC SINR offset for each of the plurality of IFCs, wherein the final calibrated IFC SINR offset for each IFC is determined by $Offset_{ifc}=IFC_{mean}+K_6*IFC_{std}$, wherein $IFC_{mean}$ is a mean of the IFC's offset SINR values, $IFC_{std}$ is the standard deviation of the values, and K is a constant between 0 and 5.

3. The system of claim 1, wherein the instructions when executed by at least one of the one or more processors, further cause the system to: compute initial statistics for the plurality of SINR measurements made by the plurality of terminals for the plurality IFCs, wherein computing the initial statistics comprises taking an average of SINR measurements made for each of the plurality of IFCs by each of the plurality of terminals.

4. The system of claim 1, wherein the instructions when executed by at least one of the one or more processors, further cause the system to: remove outlier SINR measurements for each of the plurality of terminals for each IFC.

5. The system of claim 4, wherein removing outlier SINR measurements for each of the plurality of terminals for each IFC comprises:

determining an average SINR measurement of the IFC by the terminal; and removing any SINR samples by the terminal that are more than a predetermined number of standard deviations away from the average SINR.

6. The system of claim 1, further comprising: a satellite gateway configured to receive the plurality of SINR measurements made by the plurality of terminals.

7. A method comprising:

receiving over a communications network a plurality of signal to interference-plus-noise ratio (SINR) measurements made by a plurality of terminals for a plurality of inroute frequency channels (IFCs);

normalizing the SINR measurements for each of the plurality of terminals, wherein normalizing the SINR measurements for each of the plurality of terminals comprises: for each of the plurality of terminals: determining a difference between each of the terminal's IFC SINR measurements and the terminal's maximum IFC SINR measurement, thereby creating normalized SINR offsets for each IFC;

determining one or more clear channels of the plurality of IFCs using at least the normalized SINR measurements; and determining a final calibrated IFC SINR offset for each of the plurality of IFCs.

8. The method of claim 7, wherein the final calibrated IFC SINR offset for each of the plurality of IFCs is determined by $Offset_{ifc}=IFC_{mean}+K_6*IFC_{std}$, wherein $IFC_{mean}$ is a mean of the IFC's offset SINR values, $IFC_{std}$ is the standard deviation of the values, and K is a constant between 0 and 5.

9. The method of claim 7, further comprising: computing initial statistics for the plurality of SINR measurements, wherein computing the initial statistics comprises taking an average of SINR measurements made for each of the plurality of IFCs by each of the plurality of terminals.

10. The system of claim 6, wherein the satellite gateway is configured to determine the clear channels of the plurality of IFC.

11. The system of claim 4, wherein the instructions when executed by at least one of the one or more processors, further cause the system to: after removing the outlier SINR measurements for each of the plurality of terminals for each IFC, compute an average of SINR measurements made for each of the plurality of IFCs by each of the plurality of terminals without the outlier SINR measurements.

12. The system of claim 1, wherein the one or more clear channels are determined using at least the normalized SINR offsets for each IFC.

13. The system of claim 12, wherein the one or more clear channels are determined by selecting IFCs with an average SINR offset below a predetermined threshold.

14. The system of claim 13, wherein the one or more clear channels are determined by selecting IFCs with an average SINR offset below a predetermined threshold and having at least a minimum number of terminals with SINR measurements on the channel.

15. The system of claim 12, further comprising: transmitting, to the plurality of terminals, the final calibrated IFC SINR offsets for each of the plurality of IFCs the plurality of terminals operate on.

16. The system of claim 15, wherein the final calibrated IFC SINR offsets for each of the plurality of IFCs are transmitted in a calibration table.

17. The system of claim 1, wherein the instructions when executed by at least one of the one or more processors, further cause the system to: remove from consideration SINR measurements made by each of the plurality of terminals without SINR measurements on at least one of the one or more clear channels.

18. The method of claim 7, wherein the plurality of SINR measurements made by the plurality of terminals are received by a satellite gateway over the communications network, wherein the satellite gateway determines the final calibrated IFC SINR offset for each of the plurality of IFCs.

19. The method of claim 7, further comprising: removing outlier SINR measurements for each of the plurality of terminals for each IFC.

20. The method of claim 19, wherein removing outlier SINR measurements for each of the plurality of terminals for each IFC comprises:

determining an average SINR measurement of the IFC by the terminal; and removing any SINR samples by the terminal that are more than a predetermined number of standard deviations away from the average SINR measurement.

21. The method of claim 20, further comprising: after removing the outlier SINR measurements for each of the plurality of terminals for each IFC, computing an average of SINR measurements made for each of the plurality of IFCs by each of the plurality of terminals without the outlier SINR measurements.

22. The method of claim 7 wherein the one or more clear channels are determined using at least the normalized SINR offsets for each IFC.

23. The method of claim 22, wherein the one or more clear channels are determined by selecting IFCs with an average SINR offset below a predetermined threshold.

24. The method of claim 23, wherein the one or more clear channels are determined by selecting IFCs with an average SINR offset below a predetermined threshold and having at least a minimum number of terminals with SINR measurements on the channel.

25. The method of claim 22, further comprising: transmitting, to the plurality of terminals, the final calibrated IFC SINR offsets for each of the plurality of IFCs the plurality of terminals operate on.

26. The method of claim 25, wherein the final calibrated IFC SINR offsets for each of the plurality of IFCs are transmitted in a calibration table.

27. The method of claim 7, further comprising: removing from consideration SINR measurements made by each of the plurality of terminals without SINR measurements on at least one of the one or more clear channels.

28. A method, comprising:
- a satellite gateway instructing a plurality of terminals over an outroute channel to measure a signal to interference-plus-noise ratio (SINR) of a plurality of inroute frequency channels (IFCs) corresponding to a satellite network partition;
- in response to the instruction, the satellite gateway receiving over an inroute channel a plurality of SINR measurements made by the plurality of terminals for the plurality of IFCs;
- the satellite gateway normalizing the SINR measurements for each of the plurality of terminals, wherein normalizing the SINR measurements for each of the plurality of terminals comprises: for each of the plurality of terminals: determining a difference between each of the terminal's IFC SINR measurements and the terminal's maximum IFC SINR measurement, thereby creating normalized SINR offsets for each IFC
- the satellite gateway determining a final calibrated IFC SINR offset for each of the plurality of IFCs; and
- transmitting, to the plurality of terminals, the final calibrated IFC SINR offsets.

* * * * *